(12) United States Patent (10) Patent No.: US 12,421,674 B2
Tokubi (45) Date of Patent: Sep. 23, 2025

(54) WORK MACHINE

(71) Applicant: HONDA MOTOR CO., LTD., Tokyo (JP)

(72) Inventor: Kota Tokubi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 638 days.

(21) Appl. No.: 17/894,542

(22) Filed: Aug. 24, 2022

(65) Prior Publication Data

US 2024/0068177 A1 Feb. 29, 2024

(51) Int. Cl.
| | |
|---|---|
| *E01C 19/26* | (2006.01) |
| *E01C 19/23* | (2006.01) |
| *E02D 3/02* | (2006.01) |
| E02D 3/026 | (2006.01) |

(52) U.S. Cl.
CPC ............ *E01C 19/262* (2013.01); *E01C 19/23* (2013.01); *E02D 3/026* (2013.01)

(58) Field of Classification Search
CPC ...... E01C 19/262; E01C 19/23; E01C 19/231; E01C 19/233; E01C 19/27; E01C 19/28; E01C 19/29; E01C 19/41; E01C 19/42; E01C 19/43; E01C 19/488; E01C 19/52; E01C 23/065; E02D 3/026; E02D 3/0265; E02D 3/032; E02D 3/039; E02D 3/046
See application file for complete search history.

(56) References Cited

U.S. PATENT DOCUMENTS

| | | | | |
|---|---|---|---|---|
| 9,267,245 | B1* | 2/2016 | Braun | B62D 12/00 |
| 2022/0341103 | A1* | 10/2022 | Christensen | E01C 19/282 |
| 2023/0191921 | A1* | 6/2023 | Kirst | B60L 50/60 |
| | | | | 404/75 |
| 2024/0279884 | A1* | 8/2024 | Ivanov | E01C 21/00 |

FOREIGN PATENT DOCUMENTS

| | | | | |
|---|---|---|---|---|
| CN | 114793606 | A * | 7/2022 | A01D 69/02 |
| DE | 102022000205 | A1 * | 7/2022 | A01D 69/02 |
| JP | 2013-000028 | A | 1/2013 | |
| JP | 2013220908 | A * | 10/2013 | |
| JP | 6826643 | B1 | 2/2021 | |

* cited by examiner

*Primary Examiner* — Abigail A Risic
(74) *Attorney, Agent, or Firm* — Thomas Horstemeyer, LLP

(57) ABSTRACT

A work machine that compacts a road surface by rotation of a roller, the work machine comprises: a motor that outputs a driving force for rotating the roller; a first battery and a second battery that supply electric power to the motor; and a housing that holds the motor, the first battery, and the second battery. An upper surface of the housing has: a first opening into which the first battery is insertable, and a second opening into which the second battery is insertable, and in a front view of the work machine. The first battery inserted from the first opening and the second battery inserted from the second opening are inclined in different directions with respect to a normal line of the road surface and held by the housing.

8 Claims, 6 Drawing Sheets

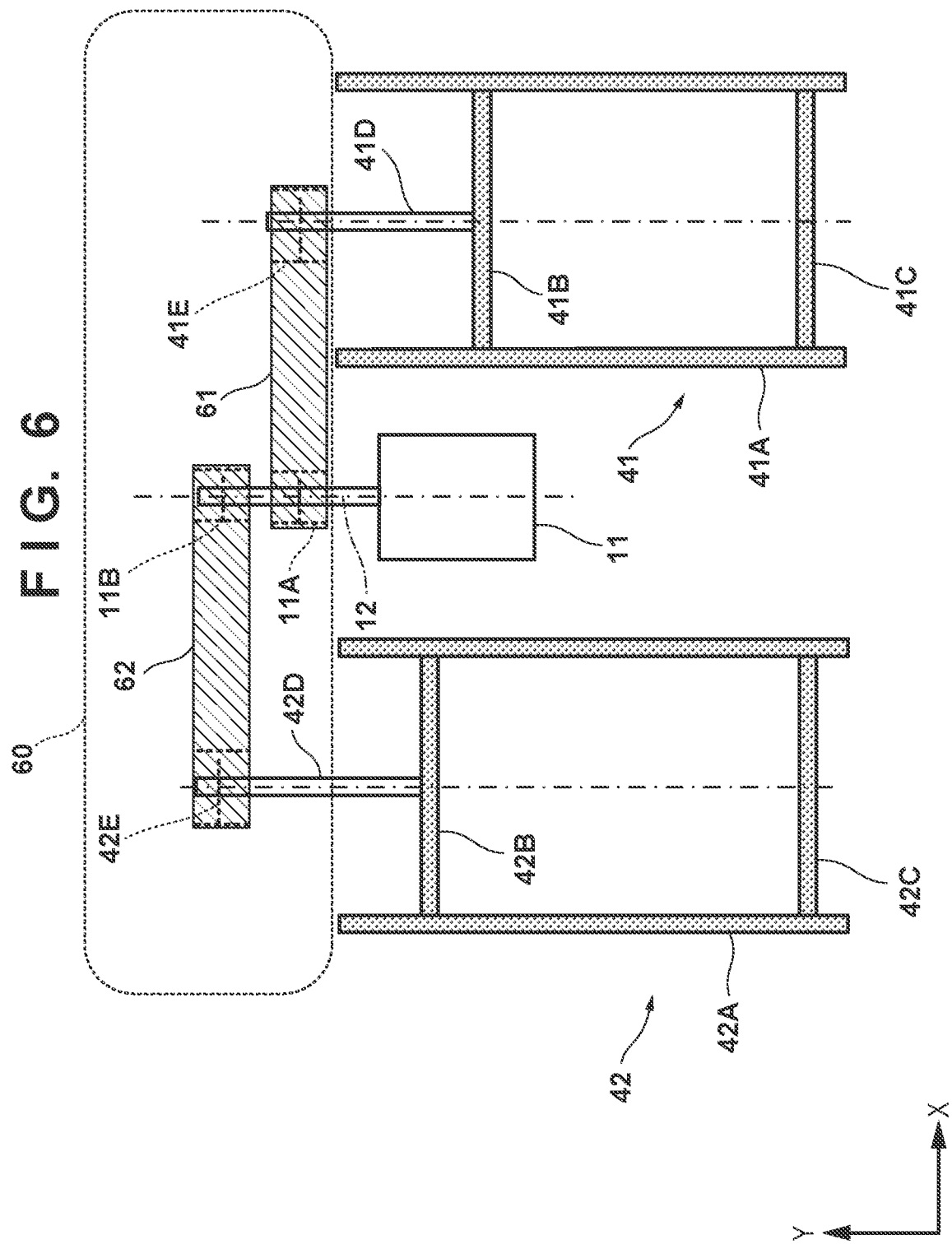

WORK MACHINE

BACKGROUND OF THE INVENTION

Field of the Invention

The present invention relates to a work machine that compacts a road surface.

Description of the Related Art

Japanese Patent Laid-Open No. 2013-28 discloses an electric lawn mower, and Japanese Patent No. 6826643 discloses a work machine (road roller) using an engine as a driving source.

In recent years, in the field of various work machines, electrification has been promoted in order to reduce $CO_2$ emission. For example, in a work machine (road roller) that compacts a road surface, there is a demand for a work machine having an excellent weight balance property in which a weight balance while a battery is mounted is substantially evenly distributed in a width direction of the work machine together with electrification.

In addition, from the viewpoint of work efficiency, there is a demand for a work machine in which the position of the battery is laid out so that the position of the center of gravity is low and the work machine does not protrude in the width direction or the like while the battery is mounted.

In view of the above problems, the present invention provides a work machine with an excellent weight balance property and work efficiency while a battery is mounted.

SUMMARY OF THE INVENTION

According to one aspect of the present invention, there is provided a work machine that compacts a road surface by rotation of a roller, the work machine comprising:
 a motor that outputs a driving force for rotating the roller;
 a first battery and a second battery that supply electric power to the motor; and
 a housing that holds the motor, the first battery, and the second battery,
 wherein an upper surface of the housing has:
 a first opening into which the first battery is insertable, and
 a second opening into which the second battery is insertable, and
 in a front view of the work machine,
 the first battery inserted from the first opening and the second battery inserted from the second opening are inclined in different directions with respect to a normal line of the road surface and held by the housing.

According to the present invention, it is possible to provide a work machine with an excellent weight balance property and work efficiency while a battery is mounted.

In addition, as compared with a case where each battery is held in the vertical direction without an inclination angle, in a case where each battery is held in an inclined state, the position of the center of gravity in the work machine can be set lower. Accordingly, operability and traveling stability of the work machine during travel can be improved.

In addition, when each battery is mounted or each mounted battery is replaced, a worker may insert or pull out each battery in an oblique direction according to the inclination angle inclined in different directions. As compared with a case where the worker inserts or pulls out a plurality of batteries in the vertical direction, it is possible to reduce a burden on the worker in mounting or replacement work of the batteries.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a view illustrating a configuration example of a power transmission mechanism of the work machine according to the embodiment.

DESCRIPTION OF THE EMBODIMENTS

Figure 1:
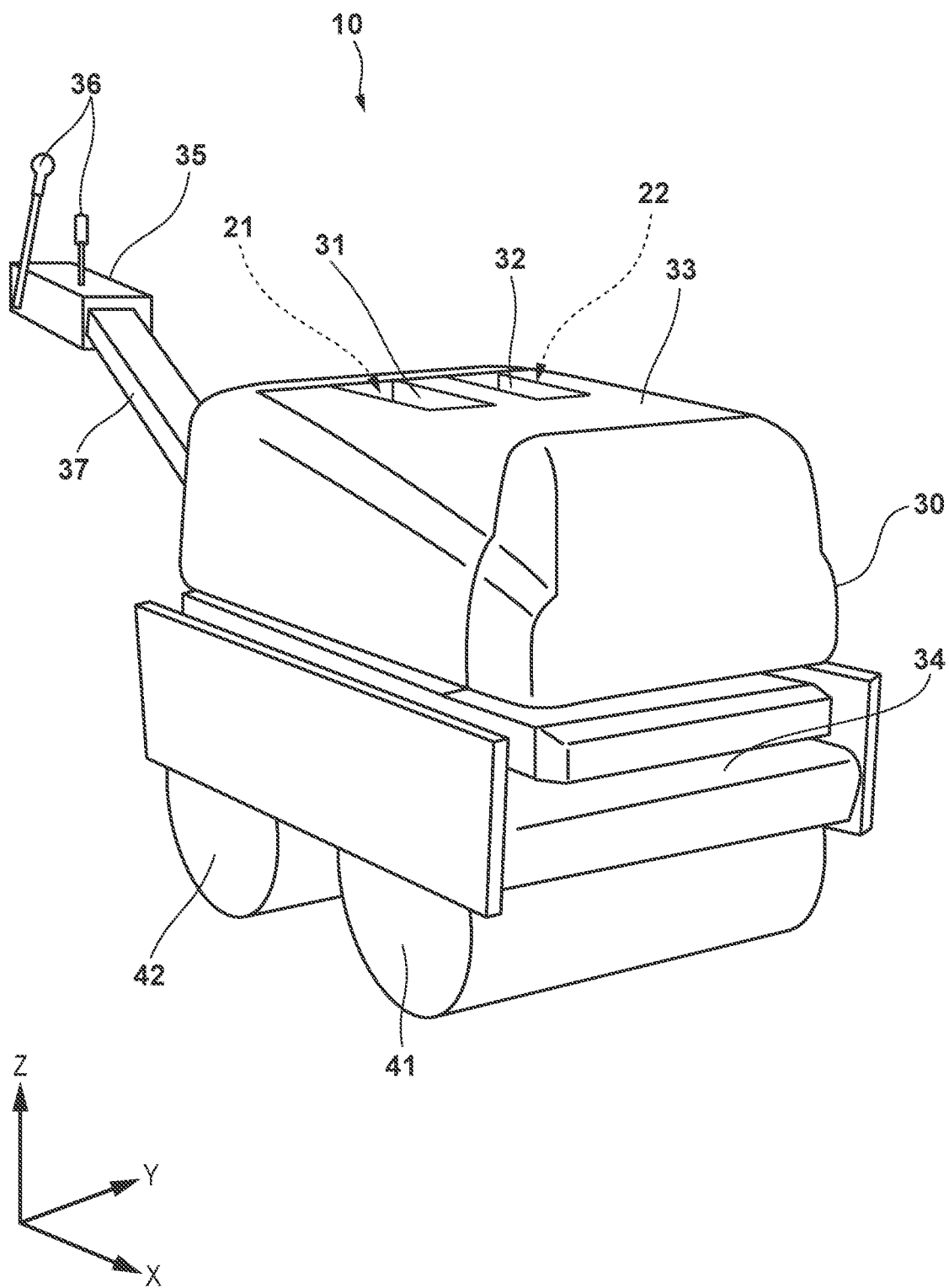
FIG. 1 is a perspective view illustrating a schematic configuration example of a work machine according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A work machine 10 according to an embodiment will be described. In each drawing described below, arrows X, Y, and Z indicate directions orthogonal to each other, an X direction indicates the front-and-rear direction of the work machine 10, a Y direction indicates the left-and-right direction (width direction) of the work machine 10, and a Z direction indicates the up-and-down direction (vertical direction) of the work machine 10.

Figure 2:
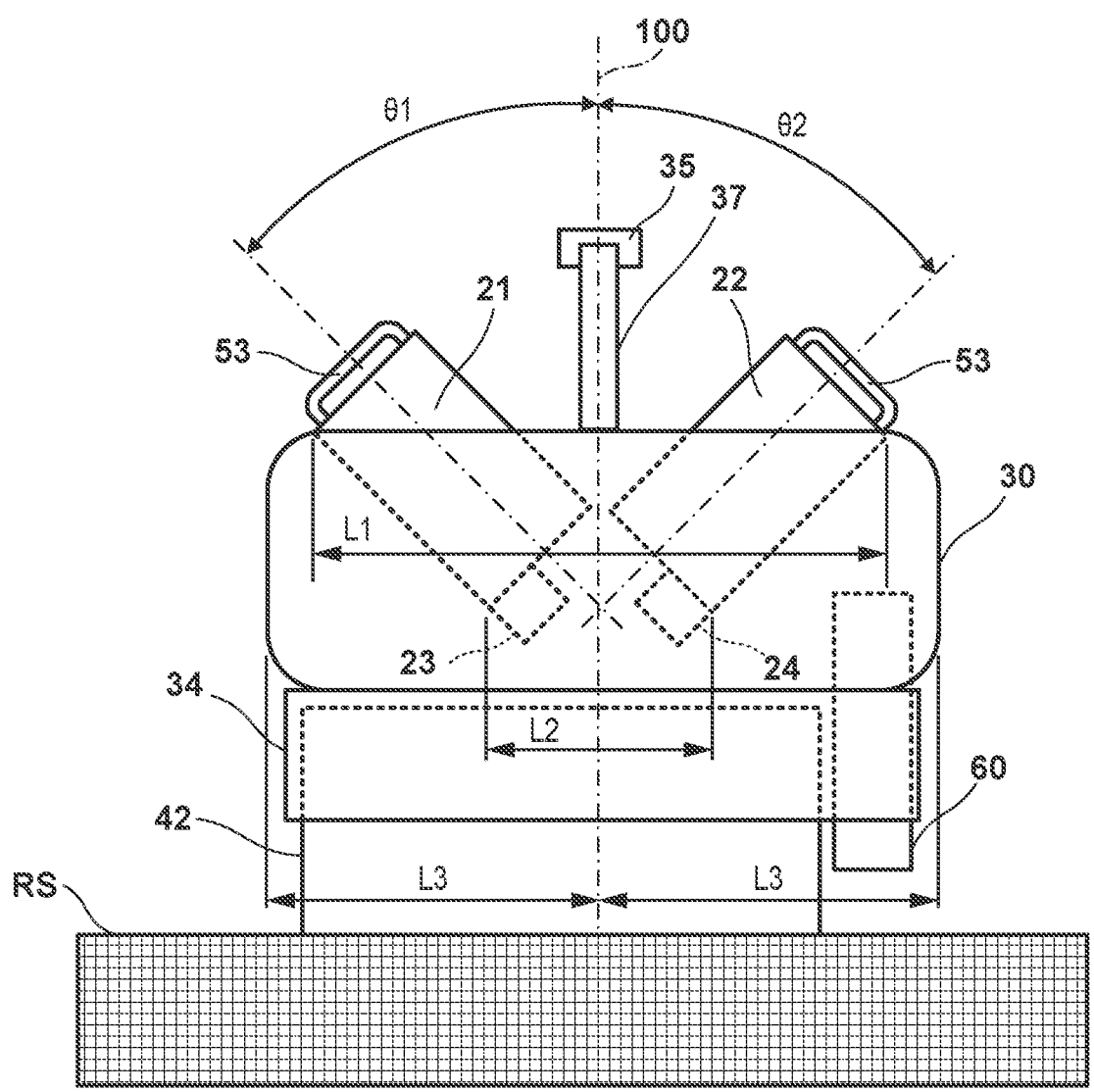
FIG. 2 is a view illustrating a schematic configuration example of the work machine in a front view (YZ plane)
Figure 3:
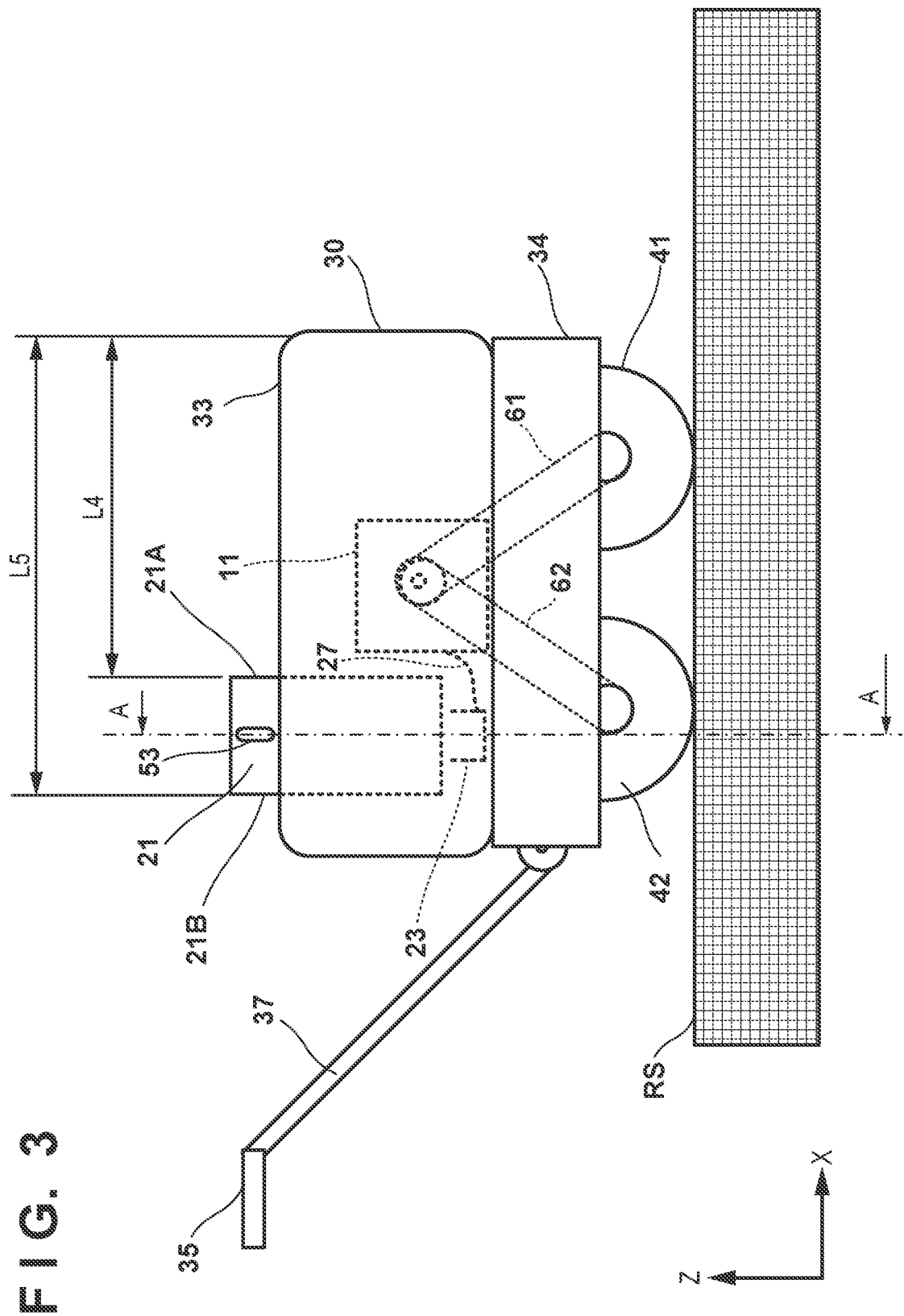
FIG. 3 is a view illustrating a schematic configuration example of the work machine in a side view (XZ plane)
Figure 4:
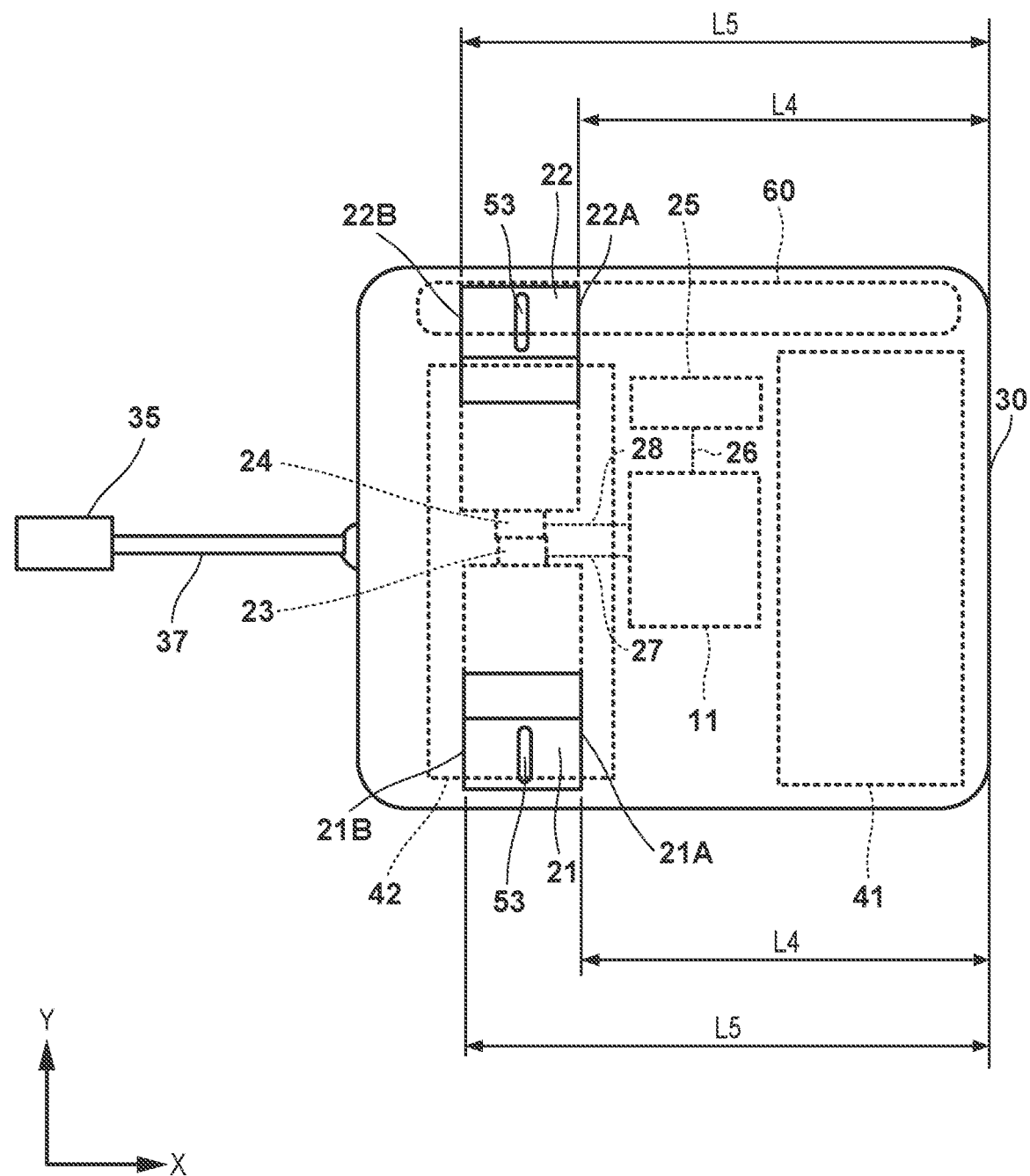
FIG. 4 is a view illustrating a schematic configuration example of the work machine in a top view (XY plane)

FIG. 1 is a perspective view illustrating a schematic configuration example of the work machine 10 according to the embodiment. Further, FIG. 2 is a view illustrating a schematic configuration example of the work machine 10 in a front view (YZ plane). FIG. 3 is a view illustrating a schematic configuration example of the work machine 10 in a side view (XZ plane), and FIG. 4 is a view illustrating a schematic configuration example of the work machine 10 in a top view (XY plane).

The work machine 10 of the present embodiment is a work machine that compacts a road surface RS by rotation of rollers 41 and 42. The work machine 10 performs work of compacting the road surface RS such as asphalt by rotation of the rollers, for example, at a construction site or the like. The work machine 10 of the present embodiment may be referred to as, for example, a road roller or a compaction machine.

The work machine 10 includes a motor 11, a housing 30, a base frame 34, a plurality of rollers (the roller 41 and the roller 42), an operation unit 35, a plurality of batteries (a first battery 21 and a second battery 22), and a controller 25. The roller 41 is also referred to as a front wheel roller, and the roller 42 is also referred to as a rear wheel roller.

The motor 11 is, for example, a servomotor capable of rotation control, and outputs a driving force for rotating the rollers 41 and 42. The driving force output from the motor 11 is transmitted to the roller 41 and the roller 42 by, for example, a power transmission mechanism as illustrated in FIG. 6.

The motor 11 includes a stator and a rotor (not illustrated), and generates power (a rotational force) for rotating the rotor and a rotary shaft 12 by energizing a coil provided on one of the stator and the rotor. In the case of the present embodiment, the motor 11 is held by the housing 30 such that the rotary shaft 12 is substantially parallel to the road surface RS.

The work machine 10 of the present embodiment includes the first battery 21 and the second battery 22 as the plurality of batteries, and the first battery 21 and the second battery 22 supply electric power to the motor 11. The first battery 21 and the second battery 22 are attachable and detachable portable batteries, and the first battery 21 and the second battery 22 are held by the housing 30 while mounted on the work machine 10.

As illustrated in FIG. 1, in a top view of the work machine 10, a first opening 31 into which the first battery 21 can be inserted and a second opening 32 into which the second battery 22 can be inserted are provided on an upper surface 33 of the housing 30.

For example, as illustrated in FIG. 2, the first battery 21 inserted from the first opening 31 and the second battery 22 inserted from the second opening 32 are inclined in different directions with respect to a normal line 100 of the road surface RS at the center position of the work machine 10 in the width direction, in a front view of the work machine 10, and held by the housing 30. In FIG. 2, a distance L3 of the housing 30 in the left-and-right direction indicates the center position of the housing 30 in the width direction. The first battery 21 is inclined by a first angle $\theta 1$ in the counterclockwise direction from the normal line 100 and held. In addition, the second battery 22 is inclined by a second angle $\theta 2$ in the clockwise direction from the normal line 100 and held. Here, the first angle $\theta 1$ and the second angle $\theta 2$ ($=-\theta 1$) have different rotation directions, but have the same absolute value of the angle.

The first battery 21 is inclined in the first direction from the normal line 100 (inclined by the first angle $\theta 1$) in a front view of the work machine 10, and held by the housing 30. In addition, the second battery 22 is inclined with respect to the normal line 100 in a second direction indicating a line-symmetric direction with respect to the first direction (inclined by the second angle $\theta 2$) in a front view of the work machine 10, and held by the housing 30.

As described above, by holding the plurality of batteries by the housing 30 in a line-symmetric positional relationship to be bilaterally symmetric with respect to the normal line 100 at the center position of the work machine 10 in the width direction, it is possible to provide a work machine with an excellent weight balance property in which the weight balance is substantially evenly distributed in the width direction.

As illustrated in FIG. 2, in a state where the first battery 21 and the second battery 22 are held in the housing 30, an upper end distance L1 between the upper end portion of the first battery 21 and the upper end portion of the second battery 22 is greater than a lower end distance L2 between the lower end portion of the first battery 21 and the lower end portion of the second battery 22. By making the upper end distance L1 greater than the lower end distance L2, when replacing the batteries, the worker only needs to grip a handle 53 and pull out each battery diagonally upward according to the inclination angle (the first angle or second angle), and compared to a case where the worker pulls out a plurality of batteries in the vertical direction, the burden on the worker in the battery replacement work can be reduced.

Similarly, the burden on the worker can be reduced when the battery is mounted. In other words, when the first battery 21 and the second battery 22 are mounted or each mounted battery is replaced, the worker may insert or pull out each battery in an oblique direction according to the inclination angle (first angle, second angle) inclined in different directions. As compared with a case where the worker inserts or pulls out a plurality of batteries in the vertical direction, it is possible to reduce a burden on the worker in mounting or replacement work of the batteries.

In addition, as compared with a case where each battery is held in the vertical direction in a state without an inclination angle, in a case where each battery is held in an inclined state, the position of the center of gravity in the work machine 10 can be set lower. Accordingly, operability and traveling stability of the work machine 10 during travel can be improved.

In a front view of the work machine 10, as illustrated in FIG. 2, the first battery 21 and the second battery 22 are held by the housing 30 without protruding from the side surface of the housing 30. According to this configuration, even when work is performed in a working environment in which there is a wall surface extending vertically upward from the road surface RS in a boundary region of a working area where the work machine 10 performs work, the work machine 10 can perform the work without contact between the first battery 21 or the second battery 22 and the wall surface.

For example, in a state where the first battery 21 or the second battery 22 protrudes from the side surface of the housing 30, there may be a region where the work machine 10 cannot perform work in an area near the wall surface so that the first battery 21 or the second battery 22 does not come into contact with the wall surface. However, in the configuration of the work machine 10 as illustrated in FIG. 2, the first battery 21 or the second battery 22 cannot come into contact with the wall surface, and thus it is possible to provide the work machine 10 with excellent work efficiency by suppressing the occurrence of a region where the work machine 10 cannot perform work.

Next, the arrangement of the plurality of batteries (the first battery 21 and the second battery 22) in the front-and-rear direction of the work machine 10 will be described. In FIGS. 3 and 4, a distance between a front end portion of the housing 30 and a front end portion 21A of the first battery 21 (a front end portion 22A of the second battery 22) is L4. In addition, a distance between the front end portion of the housing 30 and a rear end portion 21B of the first battery 21 (a rear end portion 22B of the second battery 22) is L5.

As illustrated in FIG. 3, in a side view of the work machine 10, the first battery 21 and the second battery 22 are arranged at positions offset from the center of the work machine 10 (housing 30) in the front-and-rear direction toward the operation unit 35 side.

For example, in a case where the first battery 21 and the second battery 22 are arranged at positions close to the front end portion of the housing 30 from the center of the work machine 10 (the housing 30) in the front-and-rear direction, the worker needs to move to the front end portion side of the housing 30 to perform the battery replacement work.

However, as illustrated in FIG. 3, by arranging the first battery 21 and the second battery 22 near the operation unit 35 provided with a switch 36 for the worker to operate the work machine 10, the battery replacement work can be performed at a position near the operation unit 35. After replacing the battery, the worker can quickly return to the operation unit 35 from the positions of the first battery 21 and the second battery 22 to operate the work machine 10.

According to the work machine 10 of the present embodiment, it is possible to reduce the workload required for the worker to replace the battery as compared with the case where the first battery 21 and the second battery 22 are arranged at positions close to the front end portion of the housing 30 from the center of the work machine 10 (housing 30) in the front-and-rear direction.

As illustrated in FIG. 3, in a state where the first battery 21 and the second battery 22 are held by the housing 30, the first battery 21 and the second battery 22 are held by the housing 30 at a position where the front end portion 21A of the first battery 21 and the front end portion 22A of the second battery 22 overlap each other in a side view of the work machine 10. That is, the first battery 21 and the second battery 22 are held by the housing 30 at a position where the distance L4 from the front end portion of the housing 30 to the front end portion 21A of the first battery 21 is equal to the distance L4 from the front end portion of the housing 30 to the front end portion 22A of the second battery 22.

In a side view of the work machine 10, the first battery 21 and the second battery 22 are held by the housing 30 at a position where the rear end portion 21B of the first battery 21 and the rear end portion 22B of the second battery 22 overlap each other. That is, the first battery and the second battery are held by the housing 30 at a position where the distance L5 from the front end portion of the housing 30 to the rear end portion 21B of the first battery 21 is equal to the distance L5 from the front end portion of the housing 30 to the rear end portion 22B of the second battery 22.

In FIG. 3, only the first battery 21 is visually recognizable among the plurality of batteries because the plurality of batteries are held without positional deviation in the front-and-rear direction. That is, in the first battery 21 and the second battery 22, the positions of the front end portions (21A, 22A) coincide with each other, and the positions of the rear end portions (21B, 22B) also coincide with each other.

In a top view of the work machine 10, as illustrated in FIG. 4, the distance from the front end portion of the housing 30 to front end portion 21A of the first battery 21 is L4. The distance from the front end portion of the housing 30 to the front end portion 22A of the second battery 22 is also L4 similarly to the case of the first battery 21. The distance from the front end portion of the housing 30 to the front end portion of each battery is the same.

In the positional relationship between the rear end portions of the batteries, as illustrated in FIG. 4, the distance from the front end portion of the housing 30 to the rear end portion 21B of the first battery 21 is L5. The distance from the front end portion of the housing 30 to the rear end portion 22B of the second battery 22 is also L5 similarly to the case of the first battery 21. That is, the distance from the front end portion of the housing 30 to the rear end portion of each battery is also the same.

As described above, by aligning the holding positions of the plurality of batteries in the front-and-rear direction of the work machine 10, it is possible to provide a work machine with an excellent weight balance property in the width direction and in the front-and-rear direction of the work machine 10. Further, by aligning the holding positions of the plurality of batteries in the front-and-rear direction of the work machine 10, the size of the housing 30 can be made compact. The motor 11 is arranged between the roller 41 and the roller 42 in the positional relationship of the work machine 10 in the front-and-rear direction, and is arranged at the center portion of the work machine 10 in the width direction. A part between the roller 41 and the roller 42 is a center portion of the work machine 10 in the front-and-rear direction. By arranging the motor 11 in such a positional relationship, it is possible to provide a work machine with an excellent weight balance property in the width direction and in the front-and-rear direction of the work machine 10. Further, the position of the center of gravity of the work machine can be set at the center portion in the width direction and in the front-and-rear direction.

The work machine 10 includes the operation unit 35 provided with the switch 36 for the worker to operate the work machine 10. Here, the operation of the work machine 10 includes switching operation of rotation (forward, backward) or stop of the motor 11. The operation unit 35 is provided at a tip end of a shaft 37 extending obliquely upward in the Z direction from the rear end of the work machine 10 (base frame 34), and the operation unit 35 is electrically connected to the controller 25. The operation unit 35 is provided with the switch 36, and the worker can switch between rotation (forward, backward) and stop of the motor 11 by operating the switch 36. An operation signal from the switch 36 is transmitted to the controller 25, and the controller 25 controls the motor 11 based on the operation signal.

The controller 25 is a control device that controls driving of the motor 11, includes a processor (CPU), a memory, and an interface, and is configured to be able to communicate with the plurality of batteries (21, 22) mounted via the interface. When the worker operates the switch 36, the controller 25 generates a control signal corresponding to the input operation and outputs the generated control signal to the motor 11 via a communication cable 26. The control signal includes, for example, a rotational speed signal for controlling the rotational speed (rotation speed) of the motor 11, a control signal corresponding to a forward or backward operation mode, and the like. In addition, the controller 25 outputs a power control signal to power conversion circuits 23 and 24 via a communication cable (not illustrated), and the power conversion circuits 23 and 24 control electric power to be supplied to the motor 11 based on the power control signal received from the controller 25.

The power conversion circuits 23 and 24 are so-called inverter circuits, and convert direct current supplied from the first battery 21 and the second battery 22 into alternating current for the motor 11. The power conversion circuits 23 and 24 are electrically connected to the motor 11 via the cables 27 and 28, and supply alternating current to the motor 11.

Figure 5A:
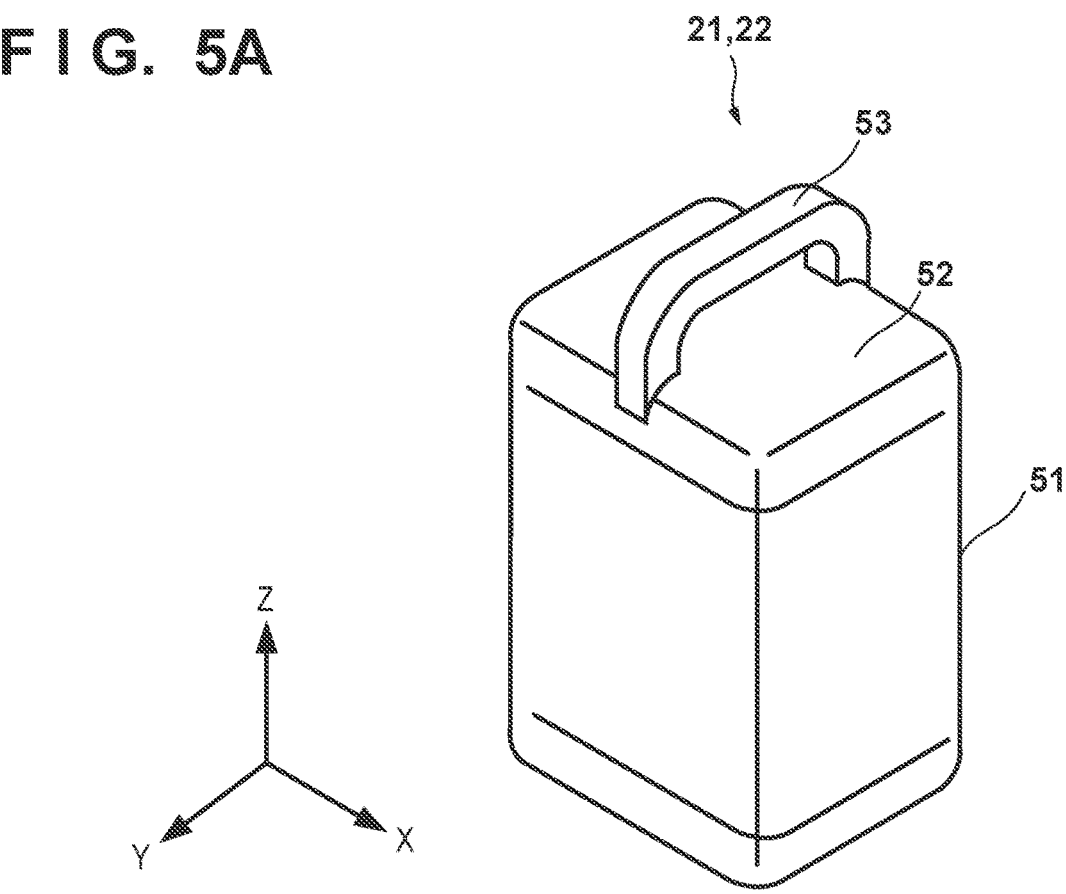
FIG. 5A is a view of a battery pack from above.
Figure 5B:
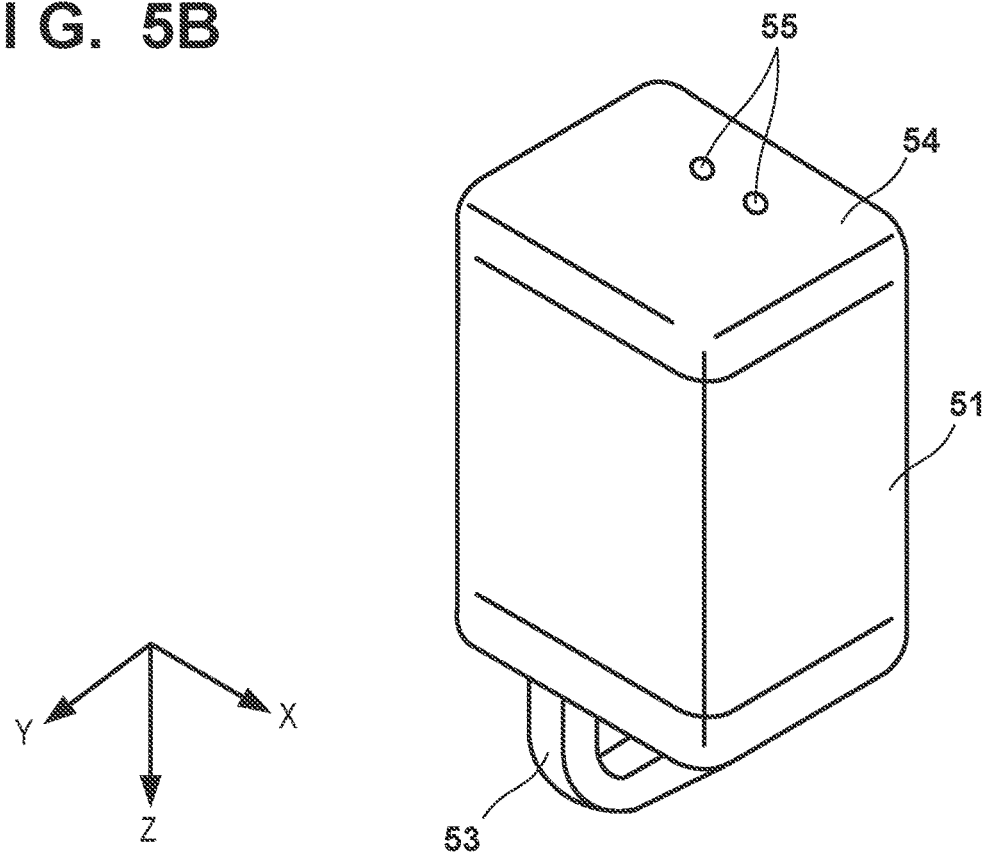
FIG. 5B is a view of the battery pack from below.

FIGS. 5A and 5B are views illustrating schematic shapes of the first battery 21 and the second battery 22 that can be used in the work machine 10 of the present embodiment, FIG. 5A is a view of the first battery 21 and the second battery 22 from above, and FIG. 5B is a view of the first battery 21 and the second battery 22 from below.

The first battery 21 and the second battery 22 are portable batteries (mobile power pack: MPP) attachable to and detachable from the housing 30 of the work machine 10, and as illustrated in FIGS. 5A and 5B, the first battery 21 and the second battery 22 include a storage battery case 51 schematically constituted by a rectangular parallelepiped exterior body, and a battery group (not illustrated) as a power storage unit accommodated in the storage battery case 51. The battery group is preferably a lithium-ion secondary battery, but is not particularly limited thereto, and for example, an all-solid-state battery or a secondary battery such as a nickel-hydrogen battery or a nickel-cadmium battery may be used.

In the work machine 10 of the present embodiment, the attachable and detachable portable battery (MPP) is used as the configurations of the first battery 21 and the second battery 22, so that the finishing work can be continuously performed without waiting for the charging time by replacing the empty portable battery (MPP) with the charged portable battery (MPP) without performing charging by connecting a power cable to the work machine 10.

The handle 53 is provided on the upper surface 52 of the storage battery case 51. The handle 53 is gripped when the worker carries the first battery 21 and the second battery 22.

As illustrated in FIG. 1, the first opening 31 and the second opening 32 are formed at positions close to the operation unit 35 operated by the worker, and the worker can mount the first battery 21 and the second battery 22 on the housing 30 from the first opening 31 and the second opening 32 while gripping the handle 53. An opening 55 into which electrode probes of the power conversion circuits 23 and 24 can be inserted is formed on a lower surfaces 54 of the first battery 21 and the second battery 22. Here, the power conversion circuit 23 is a power conversion circuit corresponding to the first battery 21, and the power conversion circuit 24 is a power conversion circuit corresponding to the second battery 22.

Inside the storage battery case 51, an electrode (not illustrated) connected to the battery group is provided. The worker grips the handle 53, inserts the first battery 21 and the second battery 22 from the first opening 31 and the second opening 32 of the housing 30, pushes the first battery 21 and the second battery 22 to the positions of the power conversion circuits 23 and 24 arranged inside the housing 30 and mounts the first battery 21 and the second battery 22. The electrode probes of the power conversion circuits 23 and 24 are connected to the electrodes of the battery group of the first battery 21 and the second battery 22 to establish electrical connection. When replacing the first battery 21 and the second battery 22, the worker grips the handle 53 and pulls out the first battery 21 and the second battery 22 obliquely upward, so that the electrical connection between the electrode probe and the electrodes of the battery group is released, and the first battery 21 and the second battery 22 can be taken out from the housing 30.

Next, a power transmission mechanism 60 of the work machine 10 will be described. FIG. 6 is a view illustrating a configuration example of the power transmission mechanism 60 of the work machine according to the embodiment.

The power transmission mechanism 60 is a mechanism that transmits power (rotation speed, rotational torque) of the motor 11 to the roller 41 and the roller 42. In the case of the present embodiment, a configuration example will be described in which a belt or the like is used as an example of a power transmission member (first power transmission member 61, second power transmission member 62) in the power transmission mechanism 60.

The base frame 34 is provided below the housing 30, and the base frame 34 rotatably supports the roller 41 and the roller 42, and a driven shaft 41D and a driven shaft 42D by a rotation supporting mechanism (not illustrated). The roller 41 includes a columnar member 41A and disk-shaped side plates 41B and 41C, and is configured in a hollow substantially cylindrical shape. Similarly to the roller 41, the roller 42 includes a columnar member 42A and disk-shaped side plates 42B and 42C, and is configured in a hollow substantially cylindrical shape.

The driven shaft 41D is provided at the center of the side plate 41B, and a driven pulley 41E is provided on the tip end side of the driven shaft 41D. In addition, the driven shaft 42D is provided at the center of the side plate 42B, and a driven pulley 42E is provided on the tip end side of the driven shaft 42D.

The motor 11 is arranged between the roller 41 and the roller 42, which is a center portion of the work machine 10 in the front-and-rear direction. The rotary shaft 12 of the motor 11 is provided with a first driving pulley 11A and a second driving pulley 11B. The rotation of the rotary shaft 12 causes the first driving pulley 11A and the second driving pulley 11B to rotate.

Here, a predetermined reduction ratio N is set between the first driving pulley 11A and the driven pulley 41E, and the power (rotational torque $T_0$) of the motor 11 is transmitted to the driven shaft 41D as a rotational torque T $(=T_0 \times R \times \eta$ (transmission efficiency)) increased based on the reduction ratio R. Power (rotation speed $N_0$) of the motor 11 is transmitted to the driven shaft 41D as a rotation speed N $(=1/N_0)$ decreased based on the reduction ratio R.

Similarly, a predetermined reduction ratio N is set between the second driving pulley 11B and the driven pulley 42E, and the power (rotational torque $T_0$) of the motor 11 is transmitted to the driven shaft 42D as the rotational torque T increased based on the reduction ratio R. Power (rotation speed $N_0$) of the motor 11 is transmitted to the driven shaft 42D as the rotation speed N decreased based on the reduction ratio R.

Power (rotation speed, rotational torque) of the motor 11 is transmitted to the driven pulley 41E via the first driving pulley 11A and the first power transmission member 61. Power (rotation speed, rotational torque) of the driven pulley 41E is transmitted to the roller 41 via the driven shaft 41D, and the roller 41 rotates.

Similarly, power (rotation speed, rotational torque) of the motor 11 is transmitted to the driven pulley 42E via the second driving pulley 11B and the second power transmission member 62. Power (rotation speed, rotational torque) of the driven pulley 42E is transmitted to the roller 42 via the driven shaft 42D, and the roller 42 rotates.

Note that the configuration example of the power transmission mechanism 60 illustrated in FIG. 6 is an example, and various modification examples can be applied as the power transmission mechanism of the work machine 10 of the present embodiment. For example, the first power transmission member 61 and the second power transmission member 62 are not limited to a belt, and a power transmission member such as a chain can be used. The motor 11 may be provided with a first motor for the roller 41 and a second motor for the roller 42.

Summary of Embodiment

Configuration 1. A work machine 10 that compacts a road surface RS by rotation of rollers 41 and 42 includes: a motor 11 that outputs a driving force for rotating the rollers 41 and 42;
a first battery 21 and a second battery 22 that supply electric power to the motor 11;
a housing 30 that holds the motor 11, the first battery 21, and the second battery 22,
in which an upper surface 33 of the housing 30 has:

a first opening 31 into which the first battery 21 is insertable, and a second opening 32 into which the second battery 22 is insertable, and in a front view of the work machine 10, the first battery 21 inserted from the first opening 31 and the second battery 22 inserted from the second opening 32 are inclined in different directions with respect to a normal line of the road surface RS, and held by the housing 30.

According to Configuration 1, it is possible to provide a work machine with an excellent weight balance property and work efficiency while a battery is mounted.

In addition, as compared with a case where each battery is held in the vertical direction in a state without an inclination angle, in a case where each battery is held in an inclined state, the position of the center of gravity in the work machine 10 can be set lower. Accordingly, operability and traveling stability of the work machine 10 during travel can be improved.

In addition, when each battery is mounted or each mounted battery is replaced, a worker may insert or pull out each battery in an oblique direction according to the inclination angle inclined in different directions. As compared with a case where the worker inserts or pulls out a plurality of batteries in the vertical direction, it is possible to reduce a burden on the worker in mounting or replacement work of the batteries.

Configuration 2. In the embodiment, the first battery 21 is inclined in a first direction from the normal line of the road surface RS at a center position of the work machine in a width direction in a front view of the work machine 10, and held by the housing 30, and the second battery 22 is inclined in a second direction indicating a line-symmetric direction with the first direction with respect to the normal line in a front view of the work machine 10, and held by the housing 30.

According to Configuration 2, by holding the plurality of batteries by the housing 30 in a line-symmetric positional relationship so as to be bilaterally symmetric with respect to the normal line 100 at the center position of the work machine 10 in the width direction, it is possible to provide a work machine with an excellent weight balance property in which the weight balance is substantially evenly distributed in the width direction.

Configuration 3. In the embodiment, in a state where the first battery 21 and the second battery 22 are held by the housing 30, an upper end distance L1 between an upper end portion of the first battery 21 and an upper end portion of the second battery 22 is greater than a lower end distance L2 between a lower end portion of the first battery 21 and a lower end portion of the second battery 22.

According to Configuration 3, when the first battery 21 and the second battery 22 are mounted or each mounted battery is replaced, the worker may insert or pull out each battery in an oblique direction according to the inclination angle (first angle, second angle) inclined in different directions. As compared with a case where the worker inserts or pulls out a plurality of batteries in the vertical direction, it is possible to reduce a burden on the worker in mounting or replacement work of the batteries.

Configuration 4. In the embodiment, the first battery 21 and the second battery 22 are held by the housing 30 at a position where a distance L4 from a front end portion of the housing 30 to a front end portion 21A of the first battery 21 is equal to a distance L4 from a front end portion of the housing 30 to a front end portion 22A of the second battery 22.

Configuration 5. In the embodiment, the first battery 21 and the second battery 22 are held by the housing 30 at a position where a distance L5 from the front end portion of the housing 30 to a rear end portion 21B of the first battery 21 is equal to a distance L5 from the front end portion of the housing 30 to a rear end portion 22B of the second battery 22.

According to Configurations 4 and 5, by aligning the holding positions of the plurality of batteries in the front-and-rear direction of the work machine 10, it is possible to provide the work machine with an excellent weight balance property in the width direction and in the front-and-rear direction of the work machine 10. Further, by aligning the holding positions of the plurality of batteries in the front-and-rear direction of the work machine 10, the size of the housing 30 can be made compact.

Configuration 6. In the embodiment, an operation unit 35 provided with a switch for a worker to operate the work machine, is further provided, and the first battery 21 and the second battery 22 are arranged at positions offset from a center of the housing 30 in a front-and-rear direction toward the operation unit 35 side.

According to the configuration 6, by arranging the first battery 21 and the second battery 22 near the operation unit 35 provided with the switch 36 for the worker to operate the work machine 10, the battery replacement work can be performed at a position near the operation unit 35. After replacing the battery, the worker can quickly return to the operation unit 35 from the positions of the first battery 21 and the second battery 22 to operate the work machine 10.

It is possible to reduce the workload required for the worker to replace the battery as compared with the case where the first battery 21 and the second battery 22 are arranged at positions close to the front end portion of the housing 30 from the center of the work machine 10 (housing 30) in the front-and-rear direction.

Configuration 7. In the embodiment, in a front view of the work machine 10, the first battery 21 and the second battery 22 are held by the housing 30 without protruding from a side surface of the housing 30.

According to the configuration 7, the size of the work machine 10 in the width direction can be made compact. In addition, even when work is performed in a working environment in which there is a wall surface extending vertically upward from the road surface RS in a boundary region of a working area where the work machine 10 performs work, the work machine 10 can perform the work without contact between the first battery 21 or the second battery 22 and the wall surface.

For example, in a state where the first battery 21 or the second battery 22 protrudes from the side surface of the housing 30, there may be a region where the work machine 10 cannot perform work in the boundary region near the wall surface so that the first battery 21 or the second battery 22 does not come into contact with the wall surface.

According to Configuration 7, the first battery 21 or the second battery 22 cannot come into contact with the wall surface, and thus it is possible to provide the work machine 10 with excellent work efficiency by suppressing the occurrence of a region where the work machine 10 cannot perform work.

Configuration 8. In the embodiment, the first battery 21 and the second battery 22 are MPPs which are portable batteries attachable to and detachable from the housing 30.

According to Configuration 8, the attachable and detachable portable battery (MPP) is used as the configurations of the first battery 21 and the second battery 22, so that the finishing work can be continuously performed without waiting for the charging time by replacing the empty portable battery with the charged portable battery without performing charging by connecting a power cable to the work machine 10.

The invention is not limited to the foregoing embodiments, and various variations/changes are possible within the spirit of the invention.

What is claimed is:

1. A work machine that compacts a road surface by rotation of a roller, the work machine comprising:
    a motor that outputs a driving force for rotating the roller;
    a first battery and a second battery that supply electric power to the motor; and
    a housing that holds the motor, the first battery, and the second battery,
    wherein an upper surface of the housing has:
    a first opening into which the first battery is insertable, and
    a second opening into which the second battery is insertable, and
    in a front view of the work machine,
    the first battery inserted from the first opening and the second battery inserted from the second opening are inclined in different directions with respect to a normal line of the road surface and held by the housing.

2. The work machine according to claim 1, wherein the first battery is inclined in a first direction from the normal line of the road surface at a center position of the work machine in a width direction in a front view of the work machine and held by the housing, and
    the second battery is inclined in a second direction indicating a line-symmetric direction with the first direction with respect to the normal line in a front view of the work machine and held by the housing.

3. The work machine according to claim 1, wherein, in a state where the first battery and the second battery are held by the housing,
    an upper end distance between an upper end portion of the first battery and an upper end portion of the second battery is greater than a lower end distance between a lower end portion of the first battery and a lower end portion of the second battery.

4. The work machine according to claim 1, wherein the first battery and the second battery are held by the housing at a position where a distance from a front end portion of the housing to a front end portion of the first battery is equal to a distance from a front end portion of the housing to a front end portion of the second battery.

5. The work machine according to claim 4, wherein the first battery and the second battery are held by the housing at a position where a distance from the front end portion of the housing to a rear end portion of the first battery is equal to a distance from the front end portion of the housing to a rear end portion of the second battery.

6. The work machine according to claim 1, further comprising: an operation unit provided with a switch for a worker to operate the work machine,
    wherein the first battery and the second battery are arranged at positions offset from a center of the housing in a front-and-rear direction toward an operation unit side.

7. The work machine according to claim 1, wherein, in a front view of the work machine, the first battery and the second battery are held by the housing without protruding from a side surface of the housing.

8. The work machine according to claim 1, wherein the first battery and the second battery are portable batteries attachable to and detachable from the housing.

* * * * *